US009262069B2

(12) United States Patent
Muroi

(10) Patent No.: US 9,262,069 B2
(45) Date of Patent: Feb. 16, 2016

(54) CONTROL DEVICE HAVING AN INPUT DISPLAY FOR DETECTING TWO TOUCH POINTS

(71) Applicant: OMRON CORPORATION, Kyoto (JP)

(72) Inventor: Yusuke Muroi, Shiga (JP)

(73) Assignee: OMRON CORPORATION, Kyoto (JP)

( * ) Notice: Subject to any disclaimer, the term of this patent is extended or adjusted under 35 U.S.C. 154(b) by 49 days.

(21) Appl. No.: 14/074,939

(22) Filed: Nov. 8, 2013

(65) Prior Publication Data

US 2014/0132537 A1    May 15, 2014

(30) Foreign Application Priority Data

Nov. 9, 2012    (JP) .................................. 2012-247305

(51) Int. Cl.
*G06F 3/041*    (2006.01)
*G06F 3/0488*    (2013.01)
*G06F 3/0484*    (2013.01)
*G05B 19/05*    (2006.01)

(52) U.S. Cl.
CPC .......... *G06F 3/0488* (2013.01); *G06F 3/04845* (2013.01); *G06F 3/04883* (2013.01); *G05B 19/054* (2013.01); *G05B 2219/13031* (2013.01); *G06F 2203/04808* (2013.01)

(58) Field of Classification Search
USPC ......................................................... 345/173
See application file for complete search history.

(56) References Cited

U.S. PATENT DOCUMENTS

| 2011/0205169 A1* | 8/2011 | Yasutake ....................... 345/173 |
| 2012/0200604 A1* | 8/2012 | Imaeda et al. ................. 345/650 |
| 2014/0028554 A1* | 1/2014 | De Los Reyes et al. ...... 345/158 |

FOREIGN PATENT DOCUMENTS

JP    2000-10608    1/2000

* cited by examiner

*Primary Examiner* — Long D Pham
(74) *Attorney, Agent, or Firm* — Greenblum & Bernstein, P.L.C.

(57) ABSTRACT

The present invention provides a new configuration for enabling an input only in the case where a user performs touch operation with the intention of performing the operation. A control device includes a control unit configured to monitor and control at least a target device and an input display unit configured to display a monitoring/controlling screen associated with the target device and also to detect touch operation performed by a user. When the input display unit detects that the user continues touching the monitoring/controlling screen at least at two points and performs rotating operation by a predetermined angle or more, the control unit changes a status value associated with touched positions of the at least two points.

2 Claims, 15 Drawing Sheets

VALID INPUT OPERATION

INVALID INPUT OPERATION

CONTROL DEVICE HAVING AN INPUT DISPLAY FOR DETECTING TWO TOUCH POINTS

BACKGROUND OF THE INVENTION

1. Technical Field

The present invention relates to a control device and a control program which control operation of machinery and equipment.

2. Related Art

As a configuration for controlling operation of machinery and equipment, a Programmable Logic Controller (hereinafter, also referred to as "PLC") and a Human Machine Interface (hereinafter, also referred to as "HMI") device which gives instructions to the PLC and also displays information inside the PLC have been generally used. For example, Japanese Unexamined Patent Publication No. 2000-10608 discloses a system including a PLC unit and a display unit.

Further, in many cases, in order to provide higher operability for an operator or the like, the HMI device includes a display for displaying various types of information and a touch panel which is arranged on the display for the operator to operate.

The above described type of touch panel, however, involves a risk of detecting an accidental contact between the operator and the display as an input and giving wrong instructions to the control device.

Then, the present invention has an object of providing a new configuration for enabling an input only in the case where a user performs touch operation with the intention of performing the operation.

SUMMARY

A control device according to an aspect of the present invention includes a control unit configured to monitor and control at least a target device and an input display unit configured to display a monitoring/controlling screen associated with the target device and also to detect touch operation performed by a user. When the input display unit determines that the user continues touching the monitoring/controlling screen at least at two points and performs rotating operation by a predetermined angle or more based on relationship between touched positions of the at least two points before and after movement of at least one of the touched positions, the control unit changes a status value associated with the touched positions of the at least two points.

Preferably, in the case where the input display unit detects touches on the monitoring/controlling screen at two points, on the condition that an interval in a lateral direction between one touched position and the other touched position is within a predetermined first range while an interval in a longitudinal direction between the touched positions is a predetermined second value or less, the input display unit starts determining whether the rotating operation by the predetermined angle or more is performed or not.

Preferably, the input display unit, in response to detection of touches on the monitoring/controlling screen at two points, detects respective touched positions as first and second starting positions, and obtains a first position after movement which is a touched position detected subsequently to the first starting position and a second position after movement which is a touched position detected subsequently to the second starting position respectively, and on the condition that an angle between a straight line connecting the first starting position and the second starting position and a straight line connecting the first position after movement and the second position after movement exceeds a predetermined value, the input display unit determines that the rotating operation by the predetermined angle or more is performed.

Preferably, the input display unit, in response to detection of touches on the monitoring/controlling screen at two points, detects respective touched positions as first and second starting positions, and obtains a first position after movement which is a touched position detected subsequently to the first starting position and a second position after movement which is a touched position detected subsequently to the second starting position respectively, and when at least one of a condition that a first central angle of a first circular arc which is obtained by interpolating between the first starting position and the first position after movement exceeds a predetermined value and a condition that a second central angle of a second circular arc which is obtained by interpolating between the second starting position and the second position after movement exceeds a predetermined value is met, the input display unit determines that the rotating operation by the predetermined angle or more is performed.

Preferably, the input display unit, in response to detection of touches on the monitoring/controlling screen at two points, detects respective touched positions as first and second starting positions, and obtains a first position after movement which is a touched position detected subsequently to the first starting position, and on the condition that an angle formed by the first starting position and the first position after movement with the second starting position as a reference exceeds a predetermined value, the input display unit determines that the rotating operation by the predetermined angle or more is performed.

Preferably, the input display unit displays an object associated with the target device, and in the case where the input display unit detects touches on the monitoring/controlling screen at two points, on the condition that the object is in a range enclosed by one touched position and the other touched position, the input display unit starts determining whether the rotating operation by the predetermined angle or more for the target device associated with the object is performed or not.

Further preferably, the input display unit displays a guide on the periphery of the object. The guide indicates a range in which the rotating operation associated with the object is enabled.

According to another aspect of the present invention, a control program to be executed by a control device is provided. The control program causes the control device to execute: a step of displaying a monitoring/controlling screen associated with a target device; and a step of detecting touch operation performed by a user; and when it is determined that the user continues touching the monitoring/controlling screen at least at two points and performs rotating operation by a predetermined angle or more based on relationship between touched positions of the at least two points before and after movement of at least one of the touched positions, a step of changing a status value associated with the touched positions of the at least two points.

Since the present invention enables an input only in the case where a user performs touch operation with the intention of performing the operation, it is possible to avoid occurrence of a problem caused by wrong operation.

DETAILED DESCRIPTION

Embodiment of the present invention will be described in detail with reference to the drawings. The same and corresponding parts of the drawings are denoted by the same reference signs and the description of them will not be repeated.

<A. Outline>

A control device according to a present embodiment includes a control unit (a PLC as described later) configured to monitor and control at least a target device such as machinery and equipment and an input display unit (an HMI device as described later) configured to display a monitoring/controlling screen associated with the target device and also to detect touch operation performed by a user. When the input display unit determines that the user continues touching the monitoring/controlling screen at least at two points and performs rotating operation by a predetermined angle or more based on relationship between the touched positions of the at least two points before and after movement of at least one of the touched positions, the control unit changes a status value associated with the touched positions of the at least two points. That is, unless the user such as an operator continues touching the input display unit at least at two points and performs rotating operation by a predetermined angle or more, a target status value (for example, a flag to put a machine into operation) is not changed. Therefore, the control device can prevent the status value from being unintentionally updated by wrong operation performed by the user. As described above, the embodiment relates to a new configuration which allows the status value to be updated only in the case where a specific user operation is performed.

<B. System Configuration>

Figure 1:
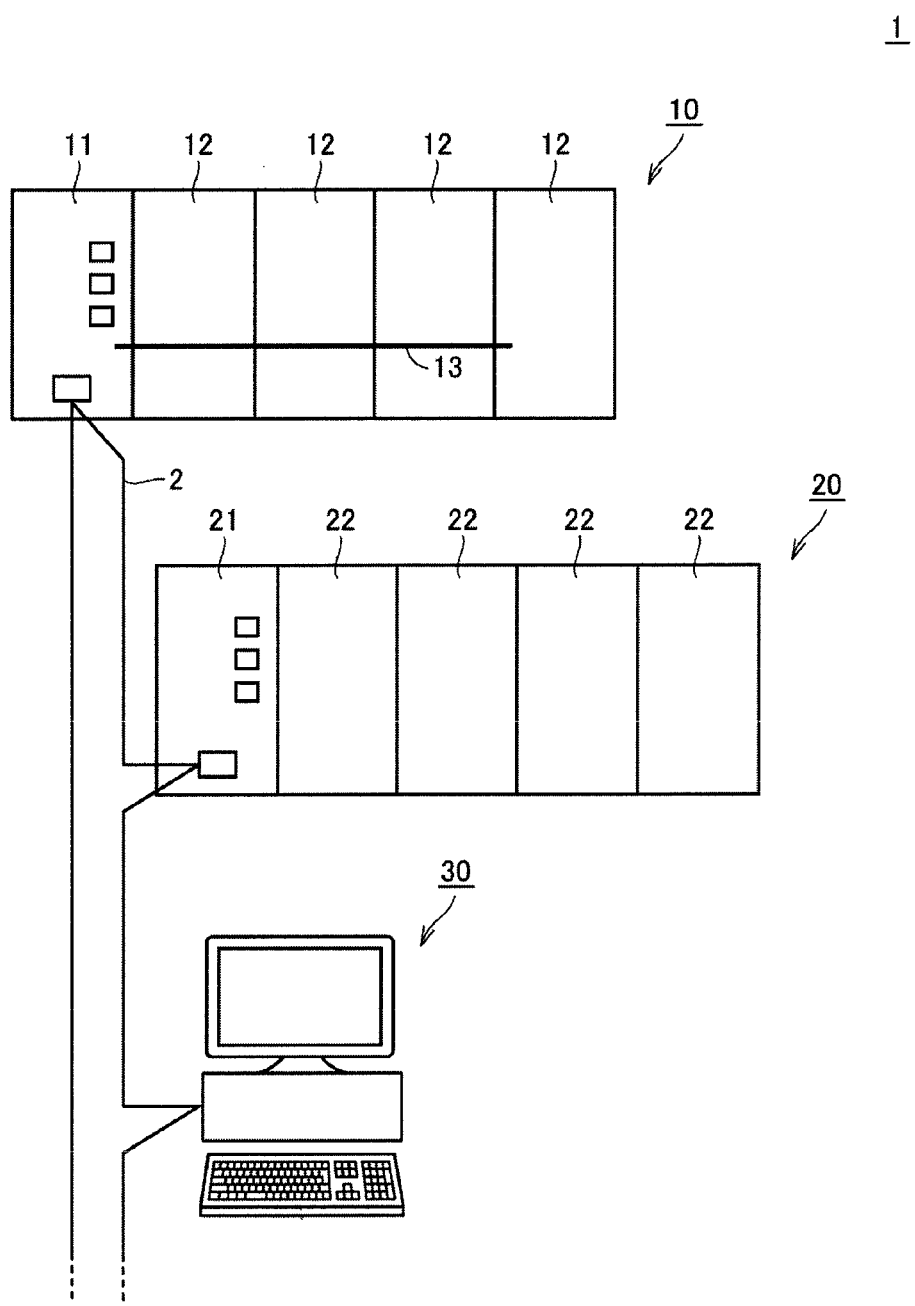
FIG. 1 is a schematic diagram illustrating a whole configuration of a control device according to an embodiment of the present invention.

First, a system configuration according to the embodiment will be described. FIG. 1 is a schematic diagram illustrating a whole configuration of a control device 1 according to an embodiment of the present invention. The control device 1 includes a PLC 10, a remote IO (Input/Output) device 20, and an HMI device 30 which are interconnected via a field network 2.

The PLC 10 monitors and controls at least a target device. More specifically, the PLC 10 includes a processing unit 11 configured to execute a program and one or more IO units 12. These units are interconnected via a system bus 13. As described later, the processing unit 11 collects field information from the IO units 12 which are connected to the processing unit 11 via the system bus 13 and/or the remote IO device 20 which is connected to the processing unit 11 via the field network 2, calculates a status value such as an output value according to the collected information, and also sends out the status value to the other devices through the field network 2.

The remote IO device 20 includes a communication unit 21 and one or more IO units 22. The communication unit 21 sends out field information collected via the IO units 22 to the PLC 10 through the field network 2, and also causes the IO units 22 to output signals according to an instruction from the PLC 10.

The HMI device 30 presents information to the user based on the status value and the like received via the field network 2, and also allows user to operate to send out the details of the operation to the PLC 10. That is, the HMI device 30, which is an interface for connecting the user and the PLC 10, allows the user to operate and instructs the PLC 10 to perform control or the like on the target device (to stop the target device or to put the target device into operation), and also sequentially updates a value indicating the status of the target device based on information from the PLC 10.

<C. Hardware Configuration>

Next, a hardware configuration of the main parts of the control device 1 illustrated in FIG. 1 will be described.

(c1: Processing Unit)

Figure 2:
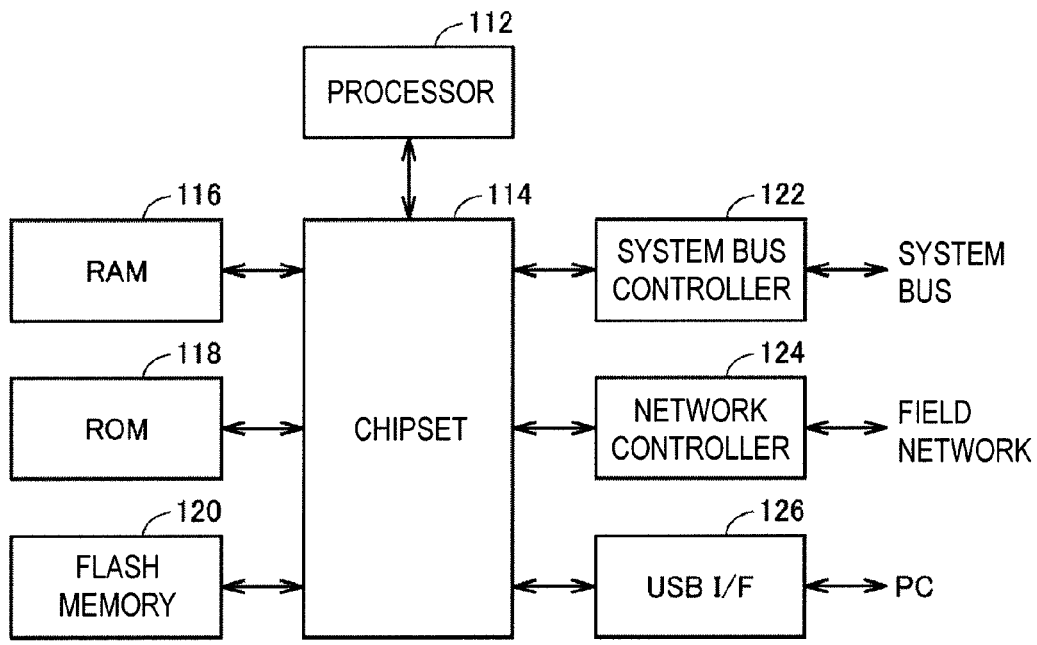
FIG. 2 is a schematic diagram illustrating a hardware configuration of a processing unit according to the embodiment of the present invention.

FIG. 2 is a schematic diagram illustrating the hardware configuration of the processing unit 11 according to the embodiment of the present invention. Referring to FIG. 2, the processing unit 11 includes a processor 112, a chipset 114, a RAM (Random Access Memory) 116, a ROM (Read Only Memory) 118, a FLASH memory 120, a system bus controller 122, a network controller 124, and a USB interface (I/F) 126. The chipset 114 and the other components are coupled via respective types of buses.

Typically, the processor 112 and the chipset 114 are configured in accordance with universal computer architecture. That is, the processor 112 interprets and executes instruction codes successively supplied in accordance with an internal clock from the chipset 114. The chipset 114 exchanges internal data with the respective connected components, and also generates an instruction code necessary to the processor 112. Further, the chipset 114 has a function of caching data and the like which are acquired as a result of arithmetic processing executed in the processor 112.

The processing unit 11 has the RAM 116 which is a volatile memory and the ROM 118 and the FLASH memory 120 which are nonvolatile memories as storage units.

The RAM 116 is a main memory which provides a working memory necessary for the processor 112 to execute a program. The ROM 118 and/or the FLASH memory 120 stores various types of program (module) including a real time OS (Operating System), a system program, and an executable program, and data including system setting parameters in a nonvolatile manner.

The processing unit 11 has the system bus controller 122 and the network controller 124 as communication interfaces. These communication interfaces send output data and receive input data. That is, the system bus controller 122 sends/receives data transmitted over the system bus 13, and the network controller 124 sends/receives data transmitted over the field network 2.

The USB interface 126 is a communication interface for connecting the PLC 10 and the HMI device 30.

(c2: HMI Device)

Figure 3:
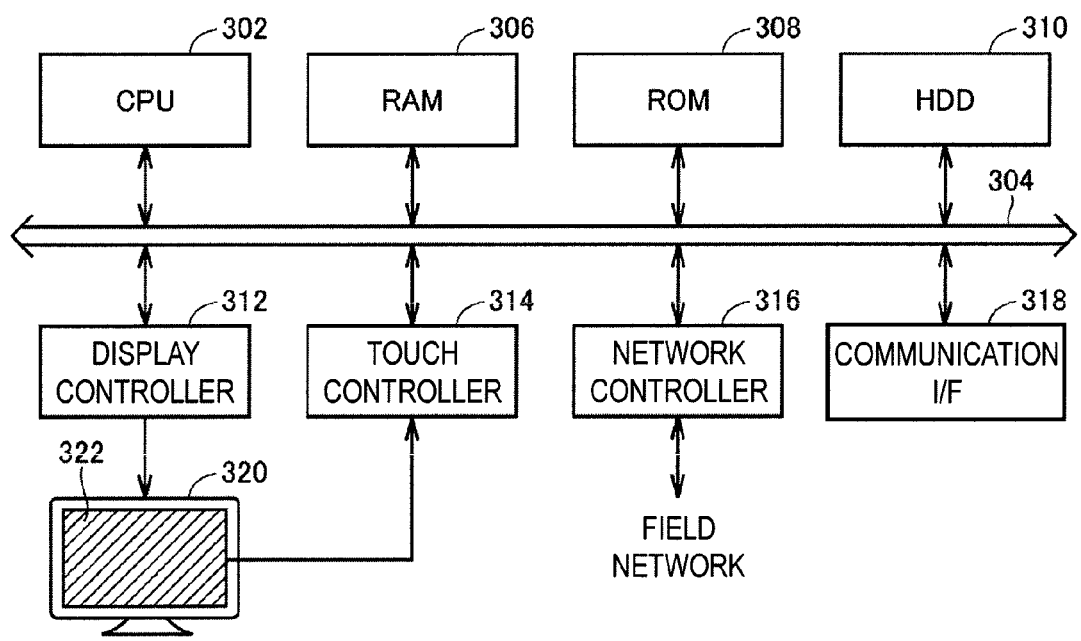
FIG. 3 is a schematic diagram illustrating a hardware configuration of an HMI device according to the embodiment of the present invention.

FIG. 3 is a schematic diagram illustrating a hardware configuration of the HMI device 30 according to the embodiment of the present invention. It is assumed that the HMI device 30 according to the embodiment is configured with a universal computer, as an example. However, in order to further improve reliability, dedicated hardware and software may also be adopted.

Referring to FIG. 3, the HMI device 30 includes a CPU 302 configured to execute various types of program including an OS, a ROM (Read Only Memory) 308 configured to store the BIOS (Basic Input /Output System) and various types of data, a RAM 306 configured to provide a work area for storing data necessary to execute a program in the CPU 302, and a hard disk (HDD) 310 configured to store a program to be executed in the CPU 302 in a nonvolatile manner. in the HMI device 30, the respective parts are interconnected via an internal bus 304.

The HMI device 30 includes a display 320 as a display unit for presenting information to the user and a display controller 312 for controlling the contents displayed on the display 320. The display 320 displays a monitoring/controlling screen associated with a target device. Further, the HMI device 30 includes a touch panel 322, as an input unit to allow the user to operate, arranged to associate with the display 320 and a touch controller 314 for detecting the user operation performed on the touch panel 322. The touch panel 322 detects touch operation performed by the user. Especially, the touch panel 322 is configured to be able to simultaneously detect a plurality of points touched by the user. Specifically, a capacitive touch panel or an optical detection-type touch panel is adopted. These display unit and input unit function as an input display unit.

Further, the HMI device 30 includes a network controller 316 for communicating with the PLC 10 (processing unit 11) and the like and a communication interface (I/F) 318 for communication through an external network (not shown).

A control program to be executed by the HMI device 30 is stored in recording media such as a CD-ROM and a DVD-ROM for distribution. The control program stored in these recording media is read by a read-out device which supports the program and installed in the hard disk 310 or the like. Alternatively, the HMI device 30 may be adapted to download the control program from an external server device via the communication interface 318 or the like for installation.

<D. User Operation>

Next, the user operation on the control device 1 according to the embodiment will be described.

(d1: Application)

Figure 4:
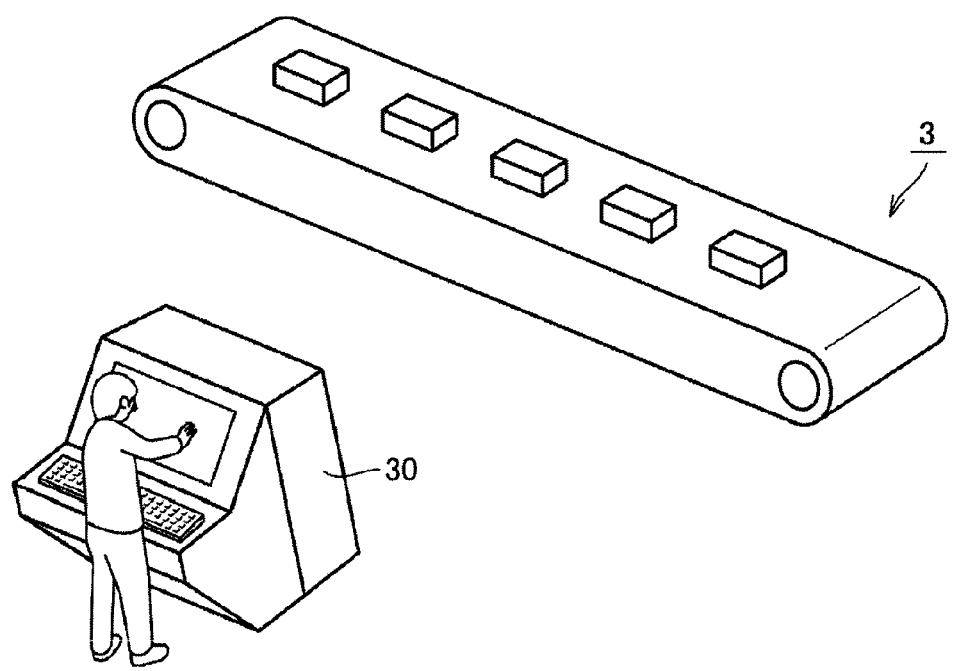
FIG. 4 is a schematic diagram illustrating an application of the control device according to the embodiment of the present invention.

FIG. 4 is a schematic diagram illustrating an application of the control device 1 according to the embodiment of the present invention. As illustrated in FIG. 4, the control device 1 monitors and controls one or more target devices associated with a production line 3 (for example, a motor, a solenoid valve, a valve, and various types of processing equipment). In such a case, an operator (hereinafter, also simply referred to as "user") of the production line 3 monitors information displayed on the HMI device 30, and also gives a necessary instruction to a target device (for example, an instruction to put the target device into operation or to stop the target device) by operating the HMI device 30. In the embodiment, it is assumed that the user is allowed to drive and operate the target device by performing touch operation on the display of the HMI device 30.

Since the user is allowed to give respective types of instruction to the target device by the above described touch operation, accidental touch operation by the user may cause malfunction of the target device. Then, the embodiment adopts a mechanism which does not simply recognize a touch given by the user with only one finger as input operation. As a result, the control device 1 can not only prevent wrong operation but also enhance a security function since it only enables operation performed by a user who has made a touch gesture which is detected as valid operation.

More specifically, the embodiment adopts a touch panel which is capable of detecting multi-touch. When the control device 1 determines that the user has continued touching the touch panel at least at two points and performed rotating operation by a predetermined angle (for example, 90°) or more, it changes a status value associated with the touched positions of at least two points.

In this specification, the "status value" may include not only a value managed in the control device 1 but also a command value and the like output from the control device 1 to the target device. That is, the user can give an instruction to change an operation mode, to put the target device into operation, to stop the target device, or the like by the above described touch operation.

(d2: Operation Examples)

Figure 5A:
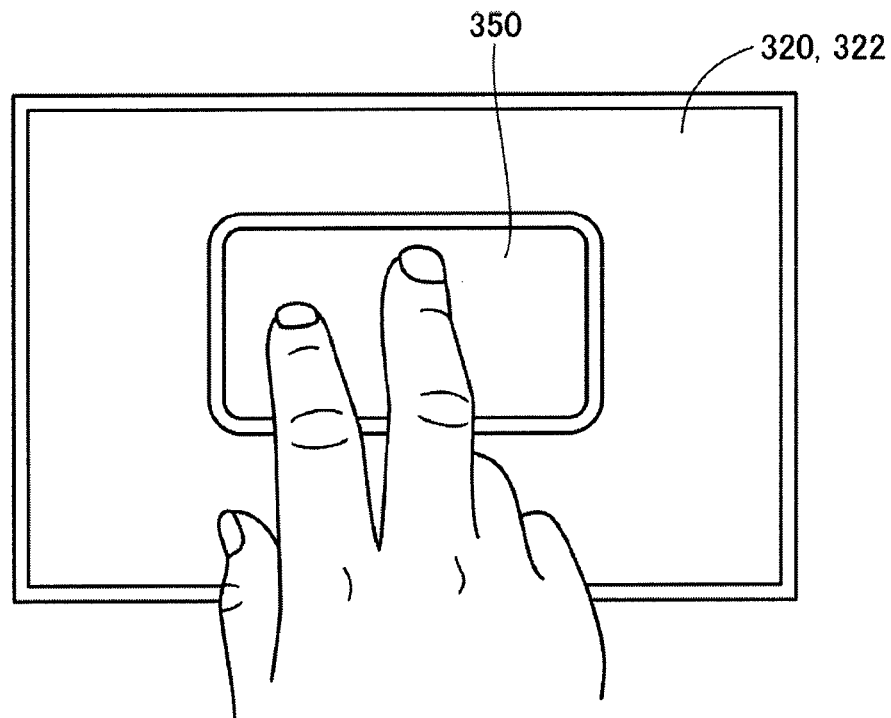
FIGS. 5A and 5B are schematic diagrams for describing an example of user operation according to the embodiment of the present invention.
Figure 5B:
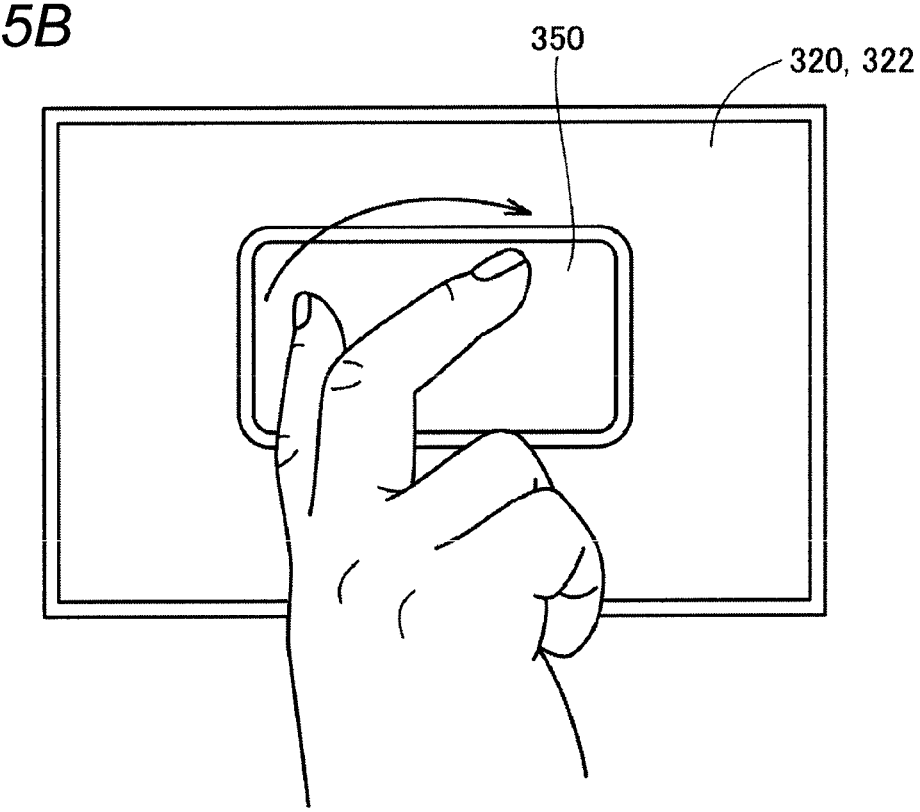

FIGS. 5 and 6 are schematic diagrams for describing examples of user operation according to the embodiment of the present invention. In the example illustrated in FIG. 5, an object 350 associated with operation is displayed on the display 320. In response to user operation in which the user touches the object 350 with the index finger and middle finger (see FIG. 5A) then rotates the two fingers clockwise while keeping the fingers touching the object 350 (see FIG. 5B), the status value associated with the object 350 is updated.

Figure 6A:
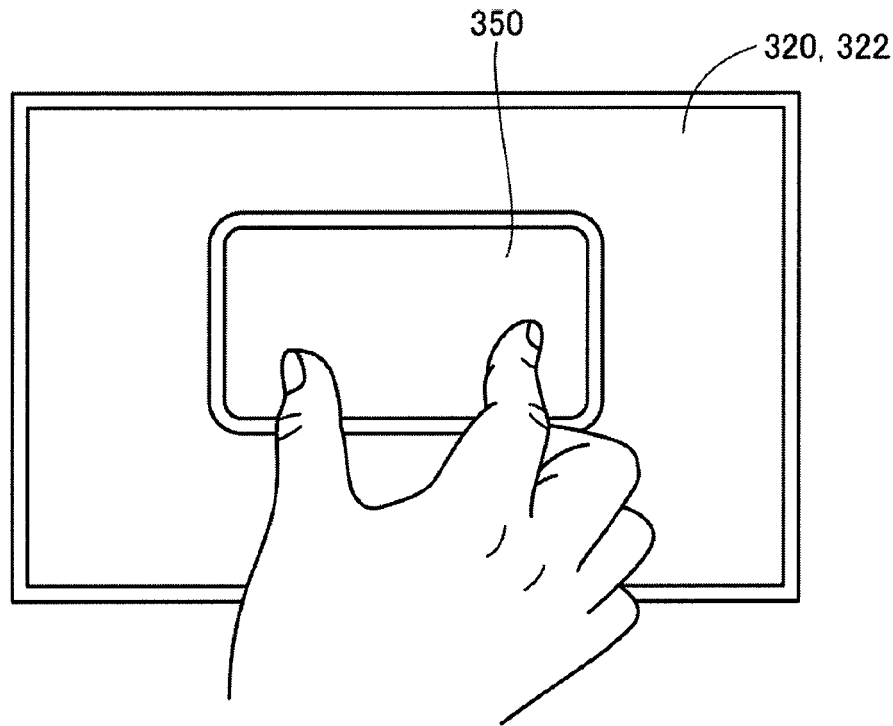
FIGS. 6A and 6B are schematic diagrams for describing another example of user operation according to the embodiment of the present invention.
Figure 6B:
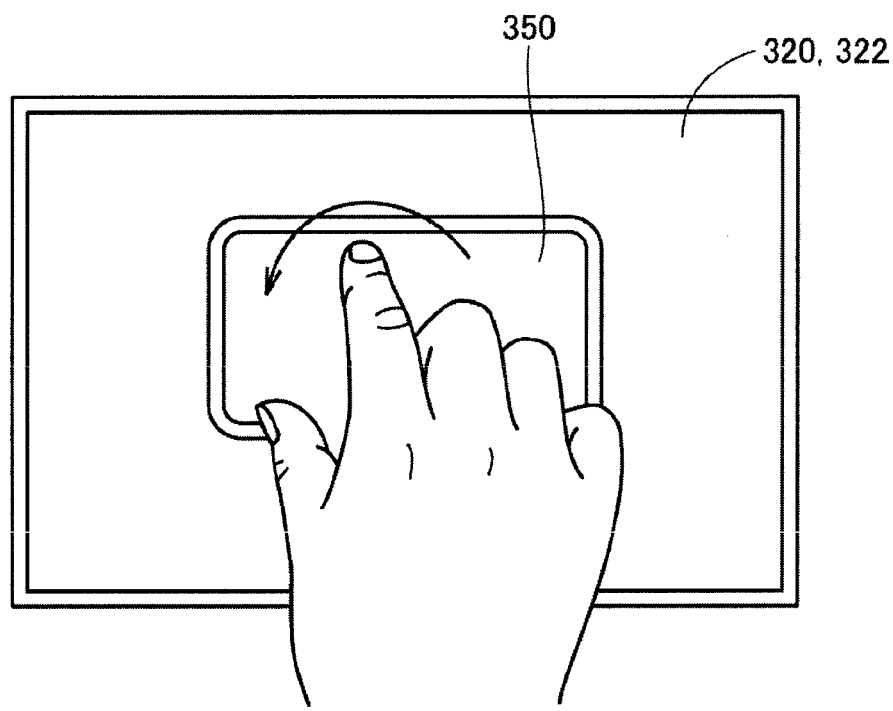

Also, in the example illustrated in FIG. 6, the object 350 associated with operation is displayed on the display 320. In response to user operation in which the user touches the object 350 with the thumb and index finger (see FIG. 6A) then rotates the two fingers counterclockwise while keeping the fingers touching the object 350 (see FIG. 6B), the status value associated with the object 350 is updated.

Figure 7A:
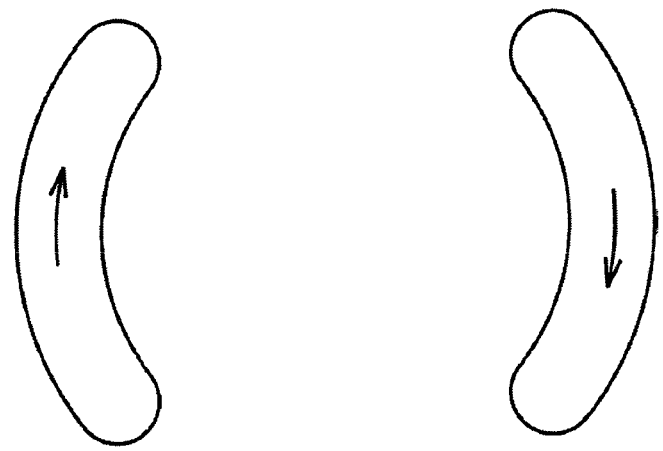
FIGS. 7A and 7B are schematic diagrams illustrating examples of locus of user operation according to the embodiment of the present invention.
Figure 7B:
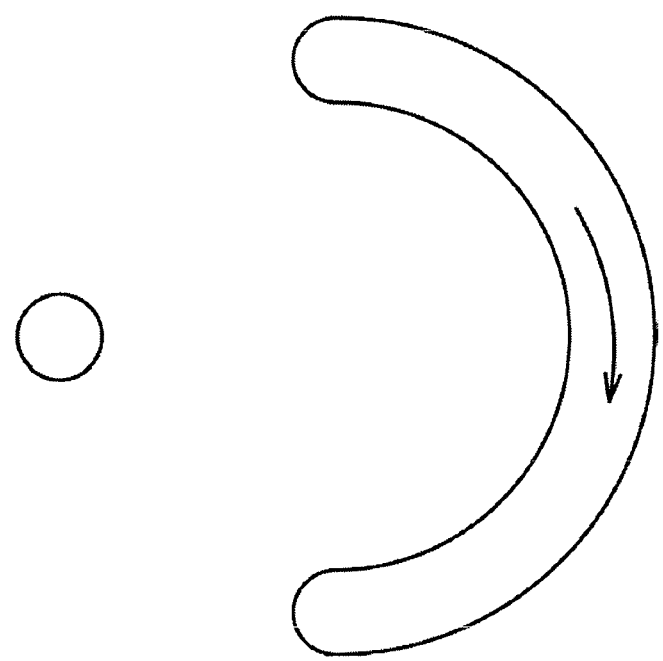

FIGS. 7A and 7B are schematic diagrams illustrating examples of locus of user operation according to the embodiment of the present invention. Rotating operation by a predetermined angle (for example, 90°) or more performed by the user while the user has continued touching the object 350 at least at two points according to the embodiment may include both of the case where the touched two points are rotated respectively as illustrated in FIG. 7A and the case where one of the touched points is not practically moved while the other touched point is rotated as illustrated in FIG. 7B.

As described above, when the HMI device 30 determines that the user has continued touching the object 350 at least at two points and performed rotating operation by a predetermined angle or more based on relationship between the touched positions of the at least two points before and after movement of at least one of the touched positions, the HMI device 30 changes the status value associated with the touched positions of the at least two points.

(d3: Prevention of Wrong Operation)

In the case where a plurality of objects are displayed on the display 320, the above described touch operation made by the user may influence the plurality of objects. That kind of operation may also be detected as operation which is not intended by the user. Therefore, in order to prevent such wrong operation, a target object of the operation may be limited based on relationship between positions touched by the user and a displayed position of the object.

Figure 8A:
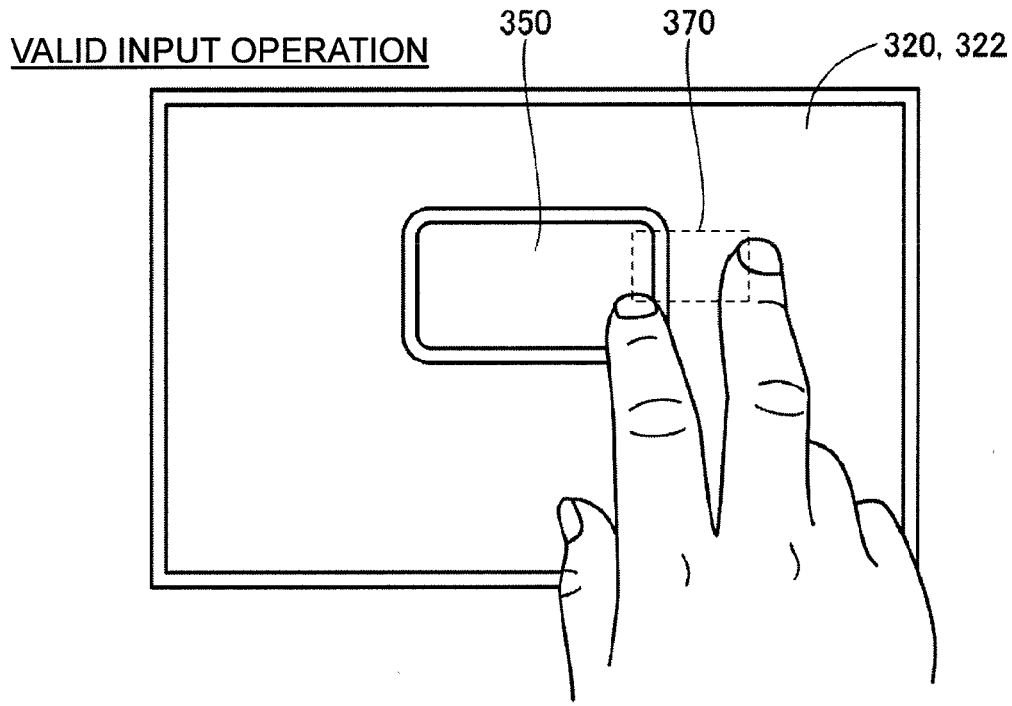
FIGS. 8A and 8B are schematic diagrams for describing an example of prevention of wrong operation according to the embodiment of the present invention.
Figure 8B:
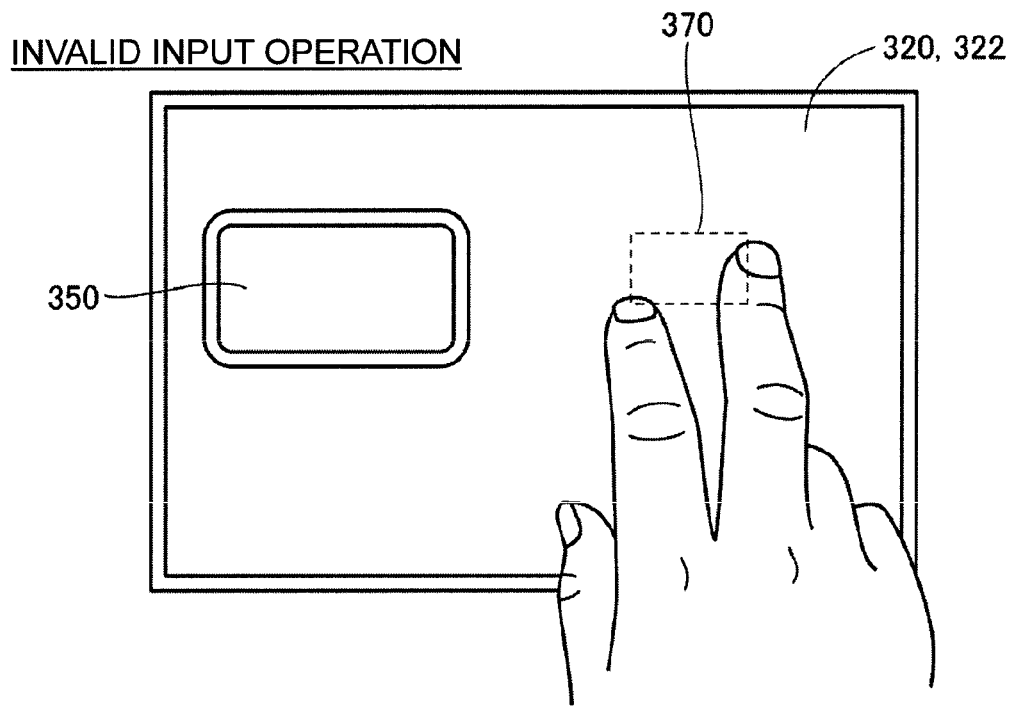

FIGS. 8A and 8B are schematic diagrams for describing an example of prevention of wrong operation according to the embodiment of the present invention. FIG. 8A illustrates an example in which touched positions of multi-touch operation by the user are adjacent to the object 350 (valid input operation) and FIG. 8B illustrates an example in which touched positions of multi-touch operation by the user are apart from the object 350 (invalid input operation).

As a method for identifying the target object of the touch operation made by the user, a method of determining the target object based on relative relationship between a range or positions of the touch operation and an arranged position or a range of the object may be adopted.

As an example of method for determining the target object of the operation based on the above described relative relationship, in the example illustrated in FIG. 8, the object 350 as an operation target is determined based on whether at least a portion of the object 350 is covered in a range 370 enclosed by the respective touched positions at the start of the multi-touch operation made by the user.

In the example illustrated in FIG. 8A, the range 370 enclosed by the index finger and middle finger is determined, and since the range 370 and a portion of the object 350 overlap with each other, the object 350 is determined to be the operation target. Then, in response to user operation in which the user has continued touching the object 350 and performed rotating operation by a predetermined angle or more, the status value associated with the object 350 is changed.

On the other hand, in the example illustrated in FIG. 8B, since the range 370 enclosed by the index finger and middle finger and the object 350 do not overlap with each other, the object 350 is not determined to be the operation target.

As described above, in the case where the HMI device 30 displays the object 350 associated with the target device and the touch panel 322 detects touches at two points, on the condition that the object 350 is in the range 370 enclosed by one of the touched positions and the other touched position, the HMI device 30 starts determining whether the rotating operation by the predetermined angle or more for the target device associated with the object 350 has been performed or not.

(d4: User Assistance)

In addition to or in place of the prevention of wrong operation illustrated in FIG. 8, a range in which the user should perform touch input may be indicated.

Figure 9:
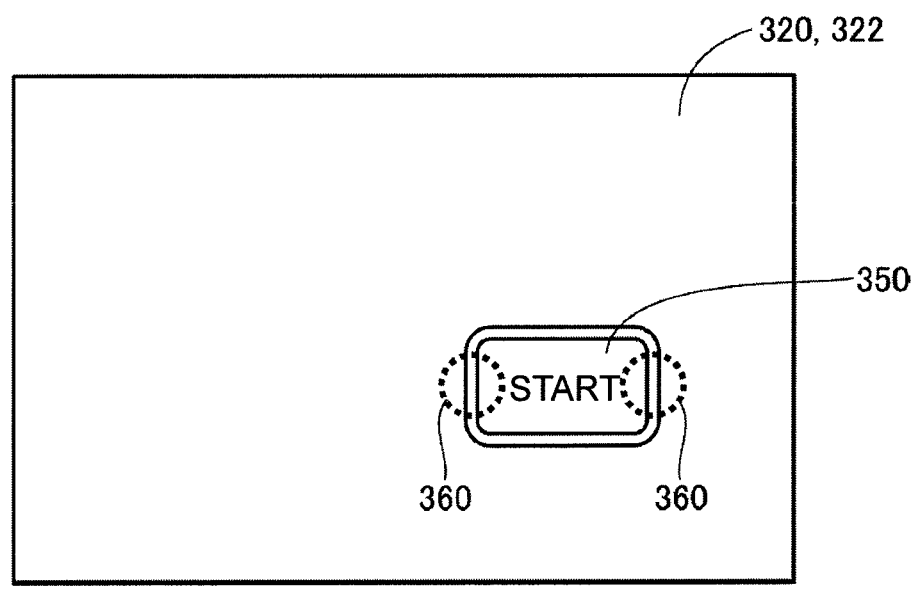
FIG. 9 is a schematic diagram for describing an example of assistance for input operation according to the embodiment of the present invention.

FIG. 9 is a schematic diagram for describing an example of assistance for input operation according to the embodiment of the present invention. As illustrated in FIG. 9, a region in which the user should touch to perform operation is displayed on the periphery of the object 350. In the example illustrated in FIG. 9, two indicators 360 indicating a range for the user to touch are displayed on both sides of the object 350. In response to user operation in which the user has simultaneously touched points in the range specified by the two indicators 360 (a region enclosed by the indicators 360) and then performed rotating operation by a predetermined angle or more, the status value associated with the object 350 is changed.

As described above, on the periphery of the object 350, the HMI device 30 displays the indicators 360 as a guide indicating a range in which the rotating operation associated with the object 350 is enabled.

Meanwhile, the indicators 360 may be always displayed on the periphery of each object or on the periphery of any one of objects as triggered by touch operation on the object or on the periphery of the object. In the latter case, the indicators 360 may be removed from the display 320 on the condition that no operation is performed for a predetermined period of time.

<E. Detection Logic>

Various types of algorithm may be used in detection of the above described rotating operation by the predetermined angle or more. For example, detection logics below may be adopted.

(e1: Detection Logic Example 1)

As a detection logic, a method of determining the rotating operation by the predetermined angle or more based on relationship between a straight line connecting two points detected at the start of touch operation and a straight line connecting two points detected in response to subsequent rotating operation may be adopted.

Figure 10A:
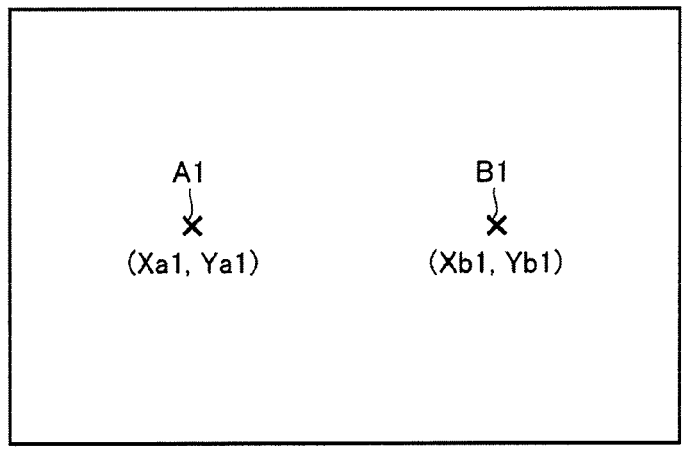
FIGS. 10A to 10C are schematic diagrams for describing an example of detection logic for rotating operation according to the embodiment of the present invention.
Figure 10B:
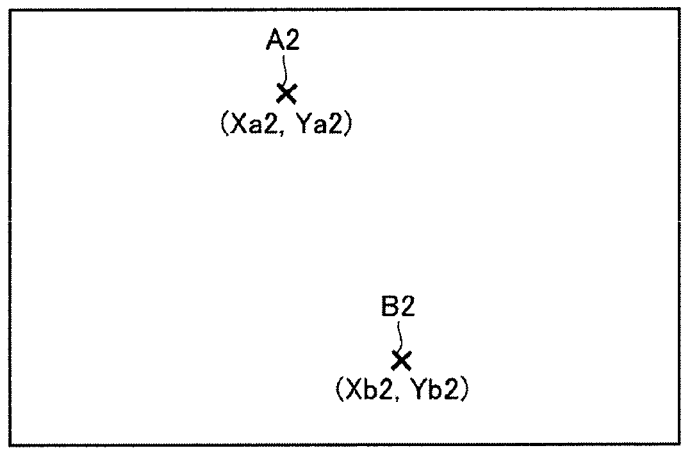
Figure 10C:
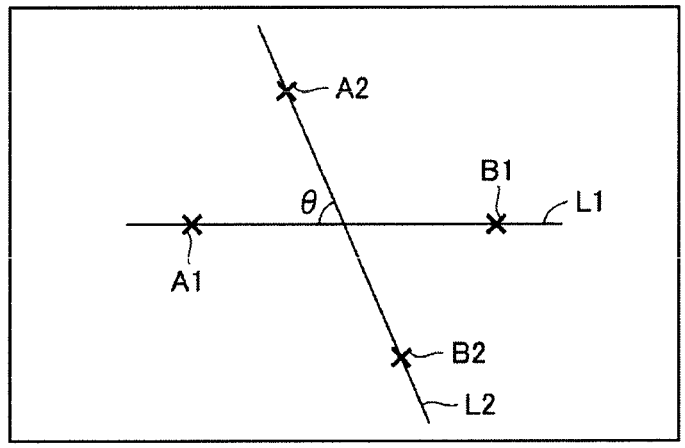

FIGS. 10A to 10C are schematic diagrams for describing an example of detection logic for rotating operation according to the embodiment of the present invention. FIG. 10A illustrates two points detected at the start of touch operation. That is, it is assumed that a point A1 and a point B1 are detected with respective coordinate values (Xa1, Ya1) and (Xb1, Yb1).

It is assumed that, subsequently, the user has continued touching the two points and performed rotating operation and the two points have moved as illustrated in FIG. 10B. It is also assumed that a point A2 and a point B2 are detected with respective coordinate values (Xa2, Ya2) and (Xb2, Yb2) at that moment.

When these coordinate values are detected, virtual straight lines are defined respectively from the sets of coordinate values detected at the respective moments as illustrated in FIG. 10C. That is, a straight line L1 connecting the point A1 and the point B1 is defined, and also a straight line L2 connecting the point A2 and the point B2 is defined. Then, a displacement angle $\theta$ as an angle formed by the line L1 and the line L2 is calculated. Whether the displacement angle $\theta$ exceeds a predetermined threshold value or not is determined, and on the condition that the displacement angle $\theta$ exceeds the threshold value, it is determined that the user has performed rotating operation.

The above described determination is repeated throughout the touch operation made by the user. At the moment when it is determined that the displacement angle $\theta$ exceeds the threshold value, a corresponding status value is changed. This detection logic can detect both kinds of user operation illustrated in FIGS. 7A and 7B.

As described above, the HMI device 30, in response to detection of touches at two points, detects respective touched positions as first and second starting positions (the point A1 and the point B1), and obtains a first position after movement (the point A2) which is a touched position detected subsequently to the first starting position (the point A1) and a second position after movement (the point B2) which is a touched position detected subsequently to the second starting position (the point B1) respectively. Then, on the condition that an angle (the displacement angle θ) between the straight line L1 connecting the first starting position (the point A1) and the second starting position (the point B1) and the straight line L2 connecting the first position after movement (the point A2) and the second position after movement (the point B2) exceeds a predetermined value, the HMI device 30 determines that the rotating operation by the predetermined angle or more has been performed.

(e2: Detection Logic Example 2)

As another detection logic, a method of estimating a circular arc (curvature) based on a locus of touch operation and, based on the estimated information, determining whether the rotating operation by the predetermined angle or more has been performed may be adopted.

Figure 11A:
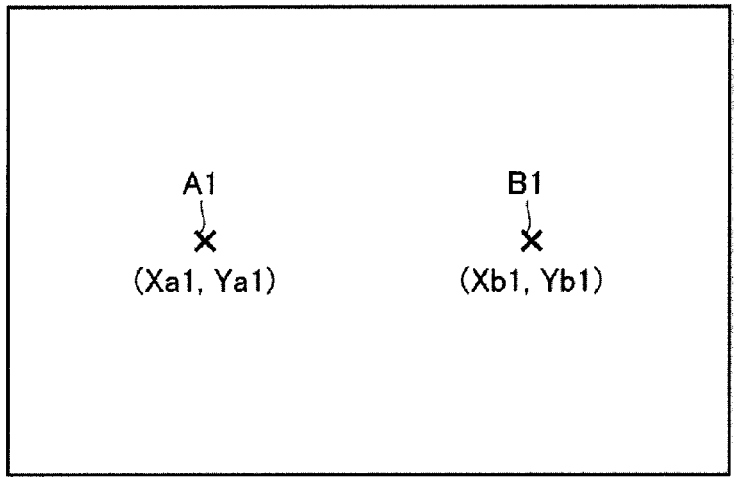
FIGS. 11A to 11C are schematic diagrams for describing another example of detection logic for rotating operation according to the embodiment of the present invention.
Figure 11B:
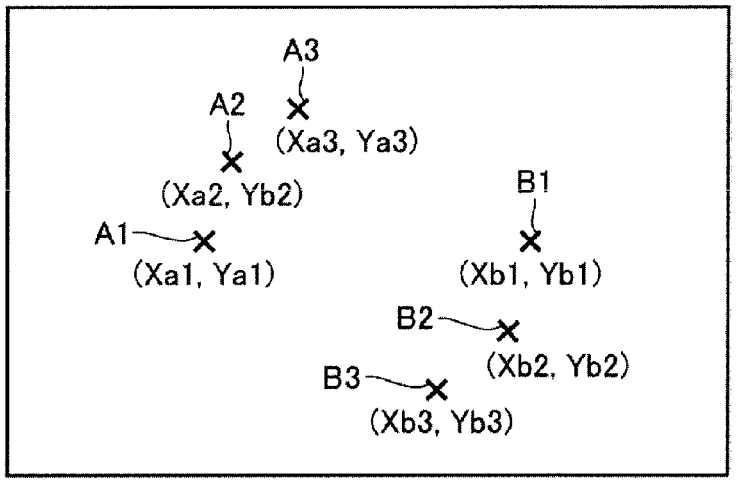
Figure 11C:
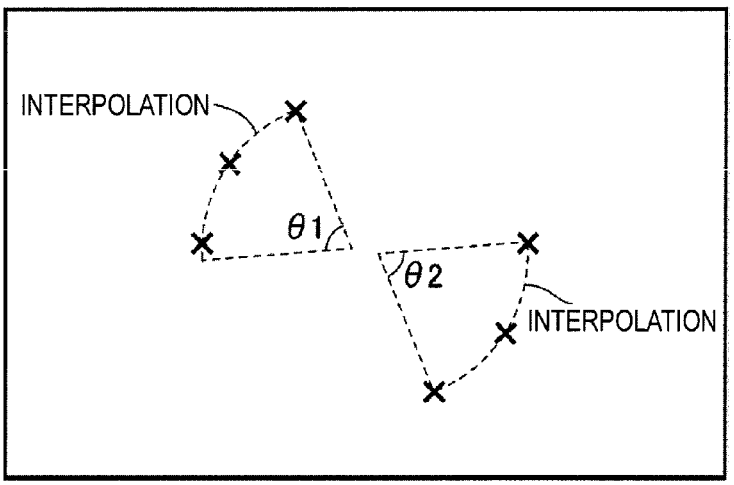

FIGS. 11A to 11C are schematic diagrams for describing another example of detection logic for rotating operation according to the embodiment of the present invention. FIG. 11A illustrates two points detected at the start of touch operation. That is, it is assumed that a point A1 and a point B1 are detected with respective coordinate values (Xa1, Ya1) and (Xb1, Yb1).

It is assumed that, subsequently, the user has continued touching the two points and moved the fingers to move the touched positions. It is assumed that, as a result of the moving operation, a locus of the point A1 (Xa1, Ya1)→a point A2 (Xa2, Ya2)→a point A3 (Xa3, Ya3) is detected for the point A1 and a locus of the point B1 (Xb1, Yb1)→a point B2 (Xb2, Yb2)→a point B3 (Xb3, Yb3) is detected for the point B1 as illustrated in FIG. 11B.

When these coordinate values are detected, a circular arc is obtained by interpolation of coordinate information about the plurality of detected points as illustrated in FIG. 11C. That is, a circular arc is obtained by interpolation of the set of the point A1, the point A2, and the point A3, and a circular arc is obtained by interpolation of the set of the point B1, the point B2, and the point B3. Then, centers and central angles θ1 and θ2 resulted from the moving operation made by the user are calculated for the respective circular arcs.

Then, whether the calculated central angles θ1 and θ2 exceed a predetermined threshold value or not are determined respectively, and on the condition that the central angle θ1 exceeds the threshold value and also the central angle θ2 exceeds the threshold value, it is determined that the user has performed the rotating operation.

The above described determination is repeated throughout the touch operation made by the user. Then, at the moment when it is determined that the central angle θ1 and/or the central angle θ2 exceeds the threshold value, a corresponding status value is changed. This detection logic can detect both kinds of user operation illustrated in FIGS. 7A and 7B.

As described above, the HMI device 30, in response to detection of touches at two points, detects respective touched positions as first and second starting positions (the point A1 and the point B1), and obtains first positions after movement (the point A2 and the point A3) which are touched positions detected subsequently to the first starting position (the point A1) and second positions after movement (the point B2 and the point B3) which are touched positions detected subsequently to the second starting position (the point B1) respectively. Then, when at least one of a condition that the first central angle θ1 of a first circular arc which is obtained by interpolation of the first starting position (the point A1) and the first positions after movement (the point A2 and the point A3) exceeds a predetermined value and a condition that the second central angle θ2 of a second circular arc which is obtained by interpolation of the second starting position (the point B1) and the second positions after movement (the point B2 and the point B3) exceeds a predetermined value is met, the HMI device 30 determines that the rotating operation by the predetermined angle or more has been performed.

(e3: Detection Logic Example 3)

As yet another detection logic, a method of estimating a formed angle based on a locus of touch operation and, based on the estimated information, determining whether rotating operation by a predetermined angle or more has been performed may be adopted.

Figure 12A:
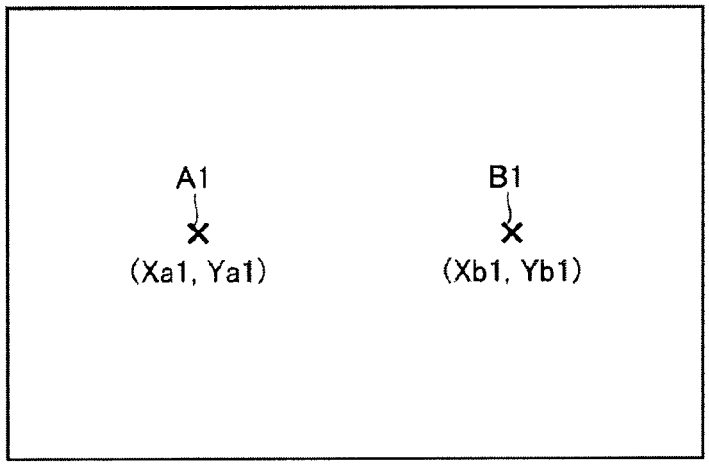
FIGS. 12A to 12C are schematic diagrams for describing yet another example of detection logic for rotating operation according to the embodiment of the present invention.
Figure 12B:
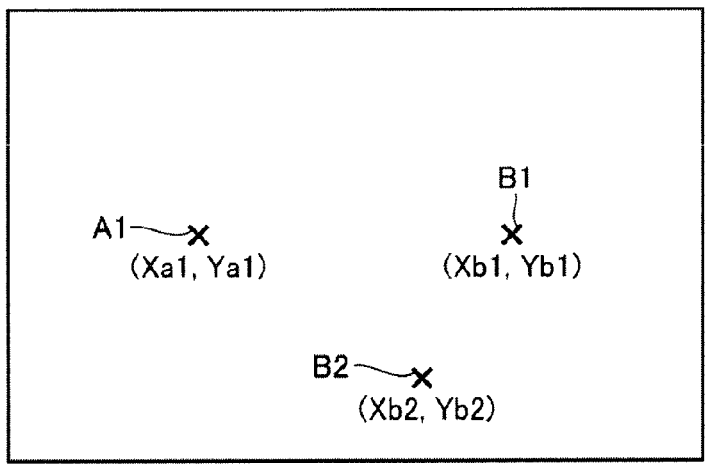
Figure 12C:
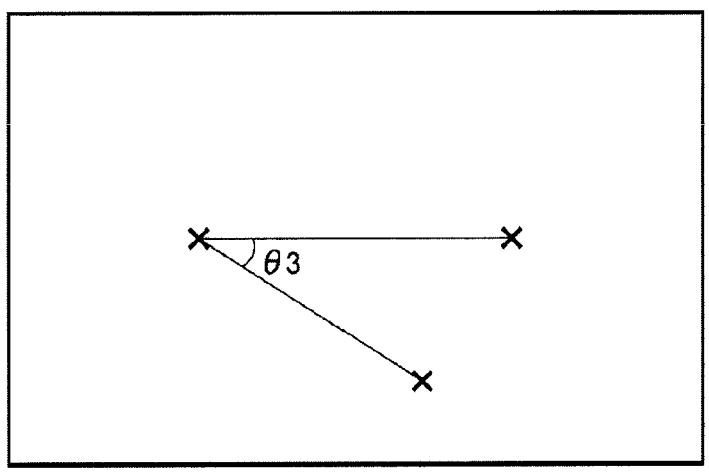

FIGS. 12A to 12C are schematic diagrams for describing yet another example of detection logic for rotating operation according to the embodiment of the present invention. FIG. 12A illustrates two points detected at the start of touch operation. That is, it is assumed that a point A1 and a point B1 are detected with respective coordinate values (Xa1, Ya1) and (Xb1, Yb1).

It is assumed that, subsequently, the user has continued touching the two points and moved the finger to move the touched position. It is assumed that, as a result of the moving operation, movement of the point A1 (Xa1, Ya1)→a point A2 (Xa2, Ya2) is detected for the point A1 and the touched position has been practically kept as it is for the point B1 (Xb1, Yb1) as illustrated in FIG. 12B.

When these coordinate values are detected, an angle formed by the point A1 and the point A2 with the point B1 which has not been practically moved as it is as the center is calculated as illustrated in FIG. 12C. That is, an angle θ3 which is formed by the three points of the point A1, the point B1, and the point A2 is calculated. Then, whether the formed angle θ3 obtained by the calculation exceeds a predetermined threshold value or not is determined, and on the condition that the formed angle θ3 exceeds the threshold value, it is determined that the user has performed rotating operation.

The above described determination is repeated throughout the touch operation made by the user. Then, at the moment when it is determined that the formed angle θ3 exceeds the threshold value, a corresponding status value is changed. This detection logic can detect the user operation illustrated in FIG. 7B.

As described above, the HMI device 30, in response to detection of touches at two points, detects respective touched positions as first and second starting positions (the point A1 and the point B1), and obtains a first position after movement (the point A2) which is a touched position detected subsequently to the first starting position (the point A1). Then, on the condition that an angle θ3 formed by the first starting position (the point A1) and the first position after movement (the point A2) with the second starting position (the point B1) as reference exceeds a predetermined value, the HMI device 30 determines that the rotating operation by a predetermined angle or more has been performed.

(e4: Constraint Conditions)

To improve the detection accuracy of the above described detection logic in detecting the rotating operation, constraint conditions as described below may be added.

For example, constraint conditions to detect that the user starts multi-touch, i.e., to determine the start of touching state may be added. More specifically, constraint conditions to detect that multi-touch is performed by the user's hand is added to the detection of multi-touch, and on the condition that the constraint conditions are met, it is determined that the touching state is started. Further, constraint conditions to detect that the multi-touch is performed with one hand or with both hands may be adopted.

Figure 13:
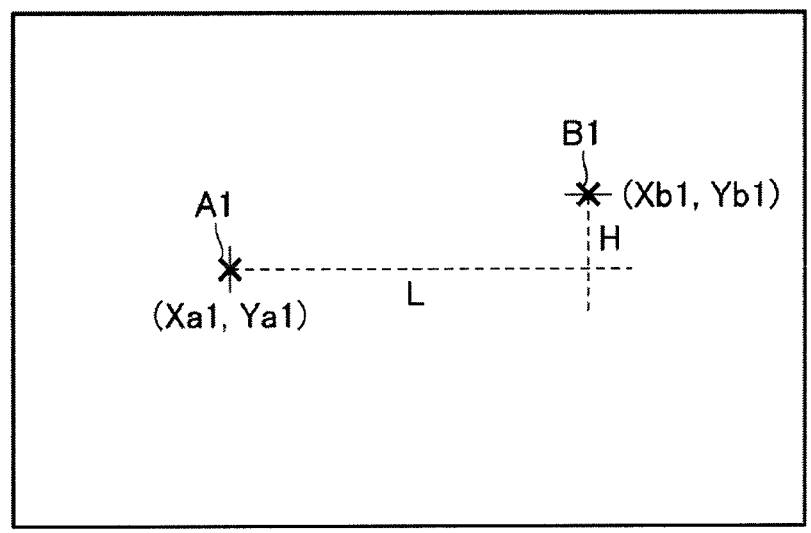
FIG. 13 is a schematic diagram for describing an example of conditions for starting detection logic for rotating operation according to the embodiment of the present invention.

FIG. 13 is a schematic diagram for describing an example of conditions for starting detection logic for rotating operation according to the embodiment of the present invention. Referring to FIG. 13, it is assumed that multi-touch is performed and a point A1 (Xa1, Ya1) and a point B1 (Xb1, Yb1) are detected as initial values, respectively.

As an example of condition for starting detection logic in that case, a condition that horizontal and vertical distances between the detected two points are respectively within predetermined ranges may be adopted.

For example, a condition that a horizontal distance L between the point A1 and the point B1 is within a predetermined range and also a vertical distance H between the point A1 and the point B1 is a predetermined value or less is considered. The condition may be used as a condition for detecting that the user has performed multi-touch with two fingers of one hand.

Alternatively, a condition that the horizontal distance L between the point A1 and the point B1 is a predetermined value or more and also the vertical distance H between the point A1 and the point B1 is within a predetermined range is considered. The condition may be used as a condition for detecting that the user has performed multi-touch with both palms (i.e., with both hands).

The HMI device 30 may be adapted to enable the aforementioned detection logics on the condition that multi-touch is detected and also any of the above described conditions is met.

As described above, in the case where touches at two points are detected, on the condition that an interval in a lateral direction (the distance H) between one of the touched positions (the point Al) and the other touched position (the point B1) is within a predetermined first range and also an interval in a longitudinal direction (the distance L) between the touched positions is a predetermined second value or less, the HMI device 30 starts determining whether rotating operation by a predetermined angle or more has been performed or not.

Further, a duration of determination as to whether multi-touch has been performed before rotating operation is performed may be limited. That is, usual user operation is expected to be completed within a certain period of time after detection of multi-touch. Then, the determination about rotating operation may be treated as time-out and stopped when a predetermined time is reached after multi-touch is detected and before rotating operation by a predetermined angle is detected.

(e5: Others)

The above described detection logics and constraint conditions may be combined as required.

<F. Procedure>

Figure 14:
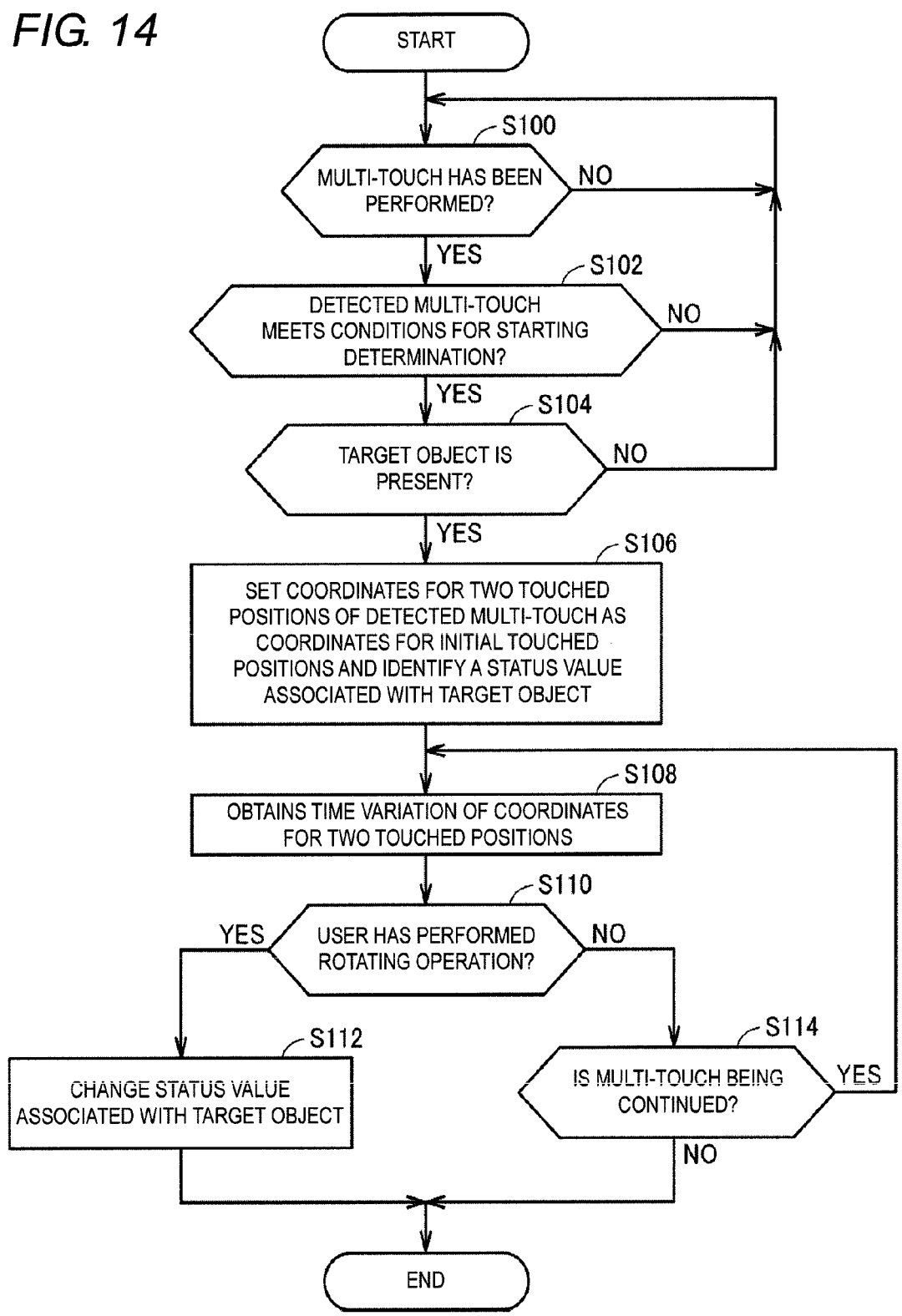
FIG. 14 is a flow chart describing a procedure for processing a touch input in the control device according to the embodiment of the present invention.

A procedure of the control device 1 according to the embodiment will be described. FIG. 14 is a flow chart describing a procedure for processing a touch input in the control device 1 according to the embodiment of the present invention. Typically, steps described in FIG. 14 are performed by the CPU 302 of the HMI device 30 executing the control program.

Referring to FIG. 14, the HMI device 30 determines whether the user has performed multi-touch or not (step S100). More specifically, the CPU 302 of the HMI device 30 determines whether coordinates for a plurality of touched positions are simultaneously detected by the touch panel 322. In the case where it is determined that the user has not performed multi-touch (in the case of NO in step S100), the process of step S100 is repeated.

In the case where it is determined that the user has performed multi-touch (in the case of YES in step S100), the HMI device 30 determines whether the detected multi-touch meets the conditions for starting determination or not (step S102). More specifically, as described above, whether the condition that the horizontal and vertical distances between the detected two points are respectively within predetermined ranges is met or not is determined. In the case where the detected multi-touch does not meet the conditions for starting determination (in the case of NO in step S102), the processes from step S100 are performed again.

In the case where the detected multi-touch meets the conditions for starting determination (in the case of YES in step S102), the HMI device 30 determines whether the target object is present or not based on the coordinates for two touched positions of the detected multi-touch (step S104). More specifically, as described above, whether any object is displayed in a range enclosed by the two touched positions or not is determined. In the case where a target object is not present (in the case of NO in step S104), the processes from step S100 are performed again.

in the case where a target object is present (in the case of YES in step S104), the HMI device 30 sets the coordinates for two touched positions of the detected multi-touch as coordinates for initial touched positions and also identifies a status value associated with the target object (step S106).

Next, the HMI device 30 obtains time variation of the coordinates for the two touched positions which are subsequently input while the multi-touch state is being continued (step S108). Then, the HMI device 30 determines whether the user has performed rotating operation by a predetermined angle or more based on the time variation of the coordinates for the two touched positions (step S110). Specifically, as described with reference to FIGS. 10 and 11, whether rotating operation by a predetermined angle or more has been performed or not is determined based on the time variation of the detected coordinates for the touched positions.

In the case where it is determined that the user has performed rotating operation by a predetermined angle or more (in the case of YES in step S110), the HMI device 30 changes the status value associated with the target object (step S112). In response to the change of status value, an instruction to start or stop or the like is issued to the target machinery, equipment, or the like, for example. Then, the procedure ends.

On the other hand, in the case where it is not determined that the user has performed rotating operation by a predetermined angle or more (in the case of NO in step S110), the HMI device 30 determines whether the multi-touch is being continued or not (step S114). In the case where it is determined that the multi-touch is being continued (in the case of YES in step S114), the processes from step S108 are repeated.

in the case where it is determined that the multi-touch is not being continued (in the case of NO in step S114), the procedure ends.

<G. Modification>

Although a configuration in which the control unit (PLC) and the input display unit (HMI device) are respectively included as independent main bodies has been exemplified in the above described embodiment, the functions of the units may be implemented as a single unit. With that configuration, the present invention is easily applied to a smaller production line, too.

<H. Other Embodiments>

Although the processes for detecting that the user has continued touching the screen at least at two points and performed rotating operation by a predetermined angle or more has been described in the above described embodiment, the present invention may be adapted to detect such user operation as described below in place of or in addition to the rotating operation.

Figure 15A:
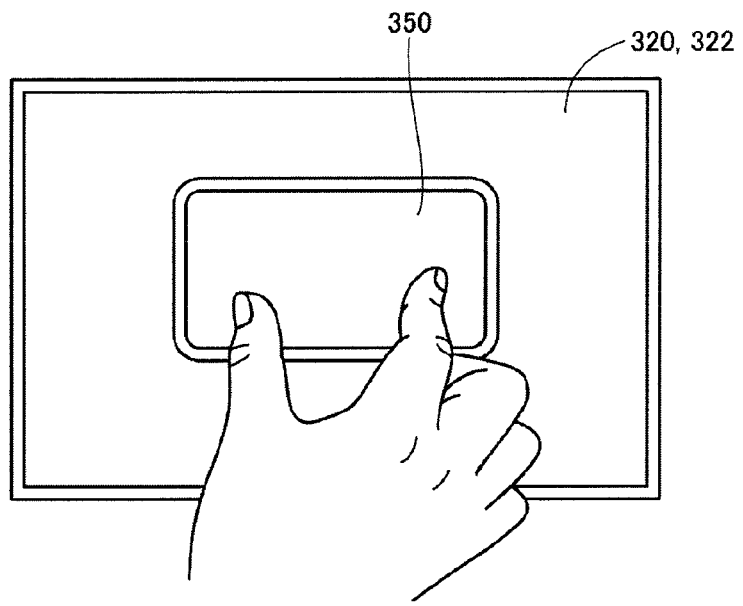
FIGS. 15A and 15B are schematic diagrams for describing an example of user operation according to another embodiment of the present invention.
Figure 15B:
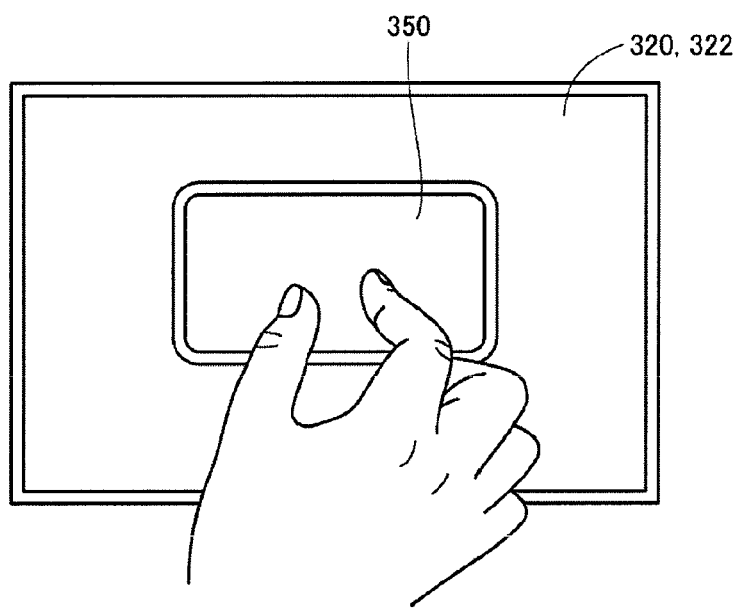

FIGS. 15A and 15B are schematic diagrams for describing an example of user operation according to another embodiment of the present invention. FIGS. 16A to 16D are schematic diagrams illustrating examples of locus of user operation according to other embodiments of the present invention. In the example illustrated in FIG. 15, an object 350 associated with operation is displayed on the display 320. In response to user operation in which the user touches the object 350 with the thumb and index finger (see FIG. 15A) and then moves the two fingers on the touched two points closer together (see FIG. 15B), a status value associated with the object 350 is updated. The present invention may update the status value associated with the object 350 in response to the user operation in which the user moves the fingers on the touched two points closer together. On the other hand, the present invention may update the status value associated with the object 350 in response to user operation in which the user moves the fingers on the touched two points apart from each other. That is, the present invention may update the status value associated with the object 350 by detecting user operation similar to so-called pinch in/pinch out operation.

Figure 16A:
FIGS. 16A to 16D are schematic diagrams illustrating examples of locus of user operation according to other embodiments of the present invention.
Figure 16B:
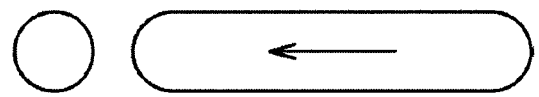
Figure 16C:
Figure 16D:
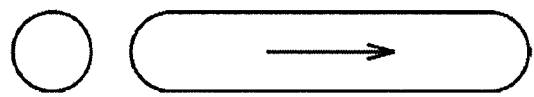

Those kinds of operation example of changing a distance between touched two points include operation illustrated in FIGS. 16A to 16D. That is, the case where touched two points are moved closer to each other as illustrated in FIG. 16A, the case where one of touched two points is not practically moved while the other touched point is moved closer to the unmoved touched point as illustrated in FIG. 16B, the case where touched two points are moved apart from each other as illustrated in FIG. 16C, and the case where one of touched two points is not practically moved while the other touched point is moved apart from the unmoved touched point as illustrated in FIG. 16D may be included.

With those kinds of operation, the present invention can further improve operability.

<I. Advantages>

According to the embodiment, a mechanism which does not simply recognize a touch given by the user with only one finger as input operation is adopted. As a result, the embodiment can not only prevent wrong operation but also enhance a security function since only a user who know a touch operation for enabling the operation can perform the operation.

The embodiments disclosed in this specification are exemplary in every aspect and should not be construed to limit the present invention. The scope of the invention is not defined by the description above but by the appended claims, and it is intended by the appended claims to cover all modifications of the present invention which have equivalent meaning and fall within the appended claims.

What is claimed is:

1. A control device comprising:
a controller that monitors and controls at least a target device; and
an input display that displays a monitoring/controlling screen associated with the target device and detects a touch operation performed by a user,
wherein, when the input display determines that the user continues touching the monitoring/controlling screen at least at two points and performs a rotating operation by a predetermined angle or more, based on a relationship between touched positions of the at least two points before and after movement of at least one of the touched positions, the controller changes a status value associated with the touched positions of the at least two points, and
when the input display detects touches on the monitoring/controlling screen at two points, and a distance in a lateral direction between one touched position and an other touched position is within a predetermined first range, and a distance in a longitudinal direction between the one touched position and the other touched position is a predetermined second value or less, the input display starts determining whether or not the rotating operation by the predetermined angle or more is performed.

2. A control device comprising:
a controller that monitors and controls at least a target device; and
an input display that displays a monitoring/controlling screen with the target device and detects a touch operation performed by a user,
wherein, when the input display determines that the user continues touching the monitoring/controlling screen at least at two points and performs a rotating operation by a predetermined angle or more, based on a relationship between touched positions of the at least two points before and after movement of at least one of the touched positions, the controller changes a status value associated with the touched positions of the at least two points, and
wherein,
in response to a detection of touches on the monitoring/controlling screen at two points, the input display detects respective touched positions as first and second starting positions, and obtains a first position after movement, which is a touched position detected subsequent to the first starting position, and a second position after movement, which is a touched position detected subsequent to the second starting position, and
when at least one of two conditions is satisfied, the input display determines that the rotating operation by the predetermined angle or more is performed, the two conditions including: a condition that a first central angle of a first circular arc, which is obtained by interpolating between the first starting position and the first position after movement, exceeds a predetermined value, and a condition that a second central angle of a second circular arc, which is obtained by interpolating between the second starting position and the second position after movement, exceeds a predetermined value.

* * * * *